United States Patent [19]

Downer

[11] 4,201,942
[45] May 6, 1980

[54] DATA CONVERSION SYSTEM

[76] Inventor: Edward W. Downer, 5252 Evergreen Dr., North Olmsted, Ohio 44070

[21] Appl. No.: 884,696

[22] Filed: Mar. 8, 1978

[51] Int. Cl.² .................................................. H04B 1/00
[52] U.S. Cl. ........................................ 375/17; 360/4; 360/41; 375/20; 375/24
[58] Field of Search ............ 325/38 A, 38 R; 178/68; 179/15 A, 15 AL; 360/4, 40, 41; 340/147 SY, 147 B, 147 CV, 147 CN

[56] References Cited

U.S. PATENT DOCUMENTS

| | | | |
|---|---|---|---|
| 2,954,267 | 9/1960 | Canepa | 360/40 |
| 3,049,698 | 8/1962 | Thompson et al. | 360/42 |
| 3,108,265 | 10/1963 | Moe | 360/40 |
| 3,218,618 | 11/1965 | Warren | 360/40 |
| 3,308,434 | 3/1967 | Glasson et al. | 340/147 SY |
| 3,369,181 | 2/1968 | Braymer | 325/141 |
| 3,502,810 | 3/1970 | Aaron et al. | 178/68 |
| 3,518,700 | 6/1970 | Kimura | 360/40 |
| 3,541,552 | 11/1970 | Carlson | 340/147 SY |
| 3,609,755 | 9/1971 | Fenyues | 340/347 DD |
| 3,646,534 | 2/1972 | Miller | 360/40 |
| 3,732,364 | 5/1973 | Terada | 360/40 |
| 3,786,201 | 1/1974 | Myers et al. | 360/40 |
| 3,793,588 | 2/1974 | Gerwin | 178/68 |
| 3,863,025 | 1/1975 | Gonsewski et al. | 178/69.1 |
| 3,921,210 | 11/1975 | Halpern | 360/40 |
| 3,988,676 | 10/1976 | Whang | 325/38 A |
| 4,020,282 | 4/1977 | Halpern | 178/68 |
| 4,118,791 | 10/1978 | Swain | 325/38 A |

Primary Examiner—Benedict V. Safourek
Assistant Examiner—Michael A. Masinick
Attorney, Agent, or Firm—Meyer, Tilberry & Body

[57] ABSTRACT

A system is disclosed for conversion of information from a preselected switching array to serial digital data utilizing conventional audio grade communications equipment such as a radio, recorder, and the like. An encoding scheme is utilized which involves amplitude modulation of the information superimposed upon a clock signal. Distortion of the digital signal due to any direct current component is avoided by using a clock signal symmetric about a zero reference. The information portion of the signal is not dependent upon variations in speed of recording media. While not limited thereto, one use of the present invention is to selectively activate any one or more of a number of system components remotely located from a centralized system control station. A series of digital pulses is generated, each one representing the desires status of each remote system component. The series of digital pulses is generated by a series of two position switches. This series of digital pulses is combined with a bipolar clock signal for transmission.

11 Claims, 7 Drawing Figures

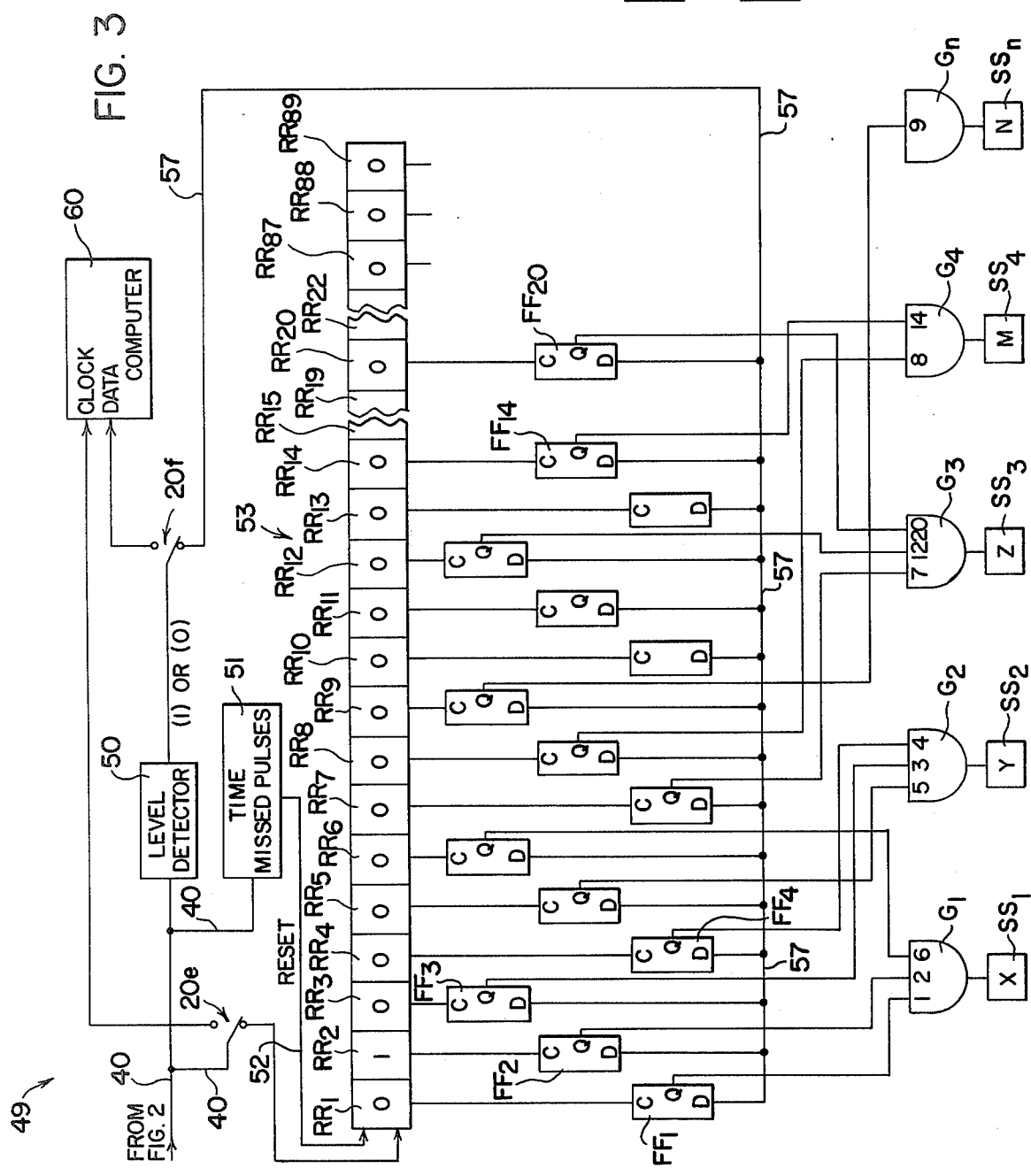

DATA CONVERSION SYSTEM

BACKGROUND OF THE INVENTION

The present invention concerns the encoding, transmitting and decoding of digital information and more particularly, using conventional audio transmitting or recording media in the transmission of digital data.

While transmission of information or data is not a recent development, an ever-increasing variety of particularly suitable methods by which the data is transmitted are continually being developed. Most often, the data, which are desired to be in digital form, are arranged to be provided as binary signals, that is "1" or "0". The method of transmission utilized is dependent upon a number of factors including the intended use of the information, the density of the information signal, and information accuracy required.

In most cases a clock signal is necessary to transmit the information, requiring that the clock signal be reconstructed either independently or extracted from the transmitted signal when decoding is desired. The transmission may be unipolar or bipolar. The terms unipolar and bipolar are utilized to refer to a particular characteristic of the signal waveform. The signal comprises a series of pulses the lengths of which are determined by characteristics of circuitry used to obtain the signals. The signal has a reference line, usually representing zero potential or current, from which the series of pulses originate. Unipolar pulses extend in only one direction from the reference line, while bipolar pulses extend in both directions.

The information signal may be single or multiple leveled, that is pulses may have more than one distinct maximum value representing different information conditions. The information may be represented by single or multiple tracks of signals.

Examples of data signals which have been frequency modulated for transmission are illustrated in U.S. Pat. Nos. 3,049,698 and 3,218,618.

U.S. Pat. No. 3,786,201 utilizes two separate digital signals (multiple tracks) for each information bit to be transmitted. The information is sampled, gain adjusted and converted into an eight bit digital signal. Two ranging bits, representing the overall gain of the sampled information, are combined with the eight bit signal to form the two tracks transmitted signal.

In high density data transmission situations, multilevel zero average singals have been utilized in systems illustrated in U.S. Pat. Nos. 3,921,210 and 4,020,282. The encoded signals actually occupy longer time intervals than the corresponding information to be encoded.

Multiplex recording of digital information and a television signal is taught in U.S. Pat. No. 3,732,364. The horizontal synchronization portion of the television signal it utilized as a clock signal to record the digital information. In order to avoid confusion with the television signal during transmission and receiving, the digital information is modulated at a frequency outside television frequency ranges.

Converting unipolar information signals into bipolar zero referenced signals, referred to as "return to zero" signals, is illustrated in U.S. Pat. No. 3,609,755. The conversion is accomplished through reflection in a short circuited matched line.

A clock signal is often utilized to encode the information for transmission. Once the information has been transmitted, the receiving system requires an identical clock signal to decode the information. Rather than remanufacture the clock signal, the simplest method is to extract the clock signal from the received signal. U.S. Pat. No. 3,518,700 teaches one such system. A binary information signal is converted into a transmission signal having a clock portion, a data portion and a high frequency portion. The high frequency portion ensures elimination of all previously recorded signals on the recording medium.

A scheme for encoding digital information is shown in U.S. Pat. No. 3,646,534. Each of two possible binary bits is represented by a different position of unipolar clock pulses.

U.S. Pat. No. 2,954,267 teaches recording and transmitting digital information encoded as a return to zero, bipolar signal. A series of negative pulses are interlaced with the information. The series of negative pulses are utilized as a clock signal for timing. The reference uses the negative pulses to ensure cancellation in the magnetic recording material immediately prior to the recording of each information bit.

A bipolar return to zero signal including information pulses and a clock signal is shown in U.S. Pat. No. 3,108,265. The clock signal is bipolar. The information pulses, which are likewise bipolar, are positioned intermediate the pulses of the clock signal. One information condition, no signal, is represented by the lack of an information pulse following a clock pulse. The other information condition is represented by a series of pulses identical to a clock pulse immediately following the pulse of the clock signal.

In U.S. Pat. No. 3,863,025 a bipolar clock signal is utilized as a carrier signal for the information. The clock is a repetition of a negative pulse immediately followed by a positive pulse. The binary information signal is encoded for recording and/or transmitting by inverting the clock signal when a binary "one" bit is present at the same time as a pulse of the clock signal.

The foregoing references concern the encoding of binary information signals for subsequent recording and/or transmitting. As will be apparent, the methods by which the binary information is encoded are as varied as are the uses of the encoded binary information. The present invention arises out of the need for a system to control a number of remotely located system components from a centralized system control station. Control of the remote system components is effected through a digital signal generated with a series of electrical switches which relate to individual remote components and the particular functions intended to be performed by those components.

SUMMARY OF THE DISCLOSURE

The present invention is primarily concerned with a data handling system which is self clocking and generates an expandable preselected binary digital signal.

A series of remotely located system components are controlled at a central system control station by digital information signals produced at the central system control station. The digital information signals are preselected by an operator to determine which remote components function. The digital information signal is combined with a clock signal, either internally generated or computer generated, and transmitted by conventional audio grade communication equipment.

The data handling system of the present invention includes a generation portion, a transmission portion and a receiving portion. In the generation portion a series of digital signals indicative of the desired status of respective remote components are generated by operator intervention. The digital signal thus produced is modulated with the assistance of a clock, counter and gating. The modulated signal is transmitted by any conventional audio grade communication system. In the receiving portion, the amplitude modulated signal is operated on to detect the digital signal originally encoded. A counter and gates are used to designate and control which remote components are to function.

These foregoing and other objects and advantages of the invention will become apparent to those skilled in the art from the following description of preferred forms thereof, and illustrations, set forth herein.

BRIEF DESCRIPTION OF THE DRAWINGS

FIG. 3 is an electrical schematic of a receiver portion of the system including data sensing and control.

FIG. 5 is a block diagram of the basic data conversion system of this invention.

DESCRIPTION OF THE PREFERRED EMBODIMENTS

Figure 1:
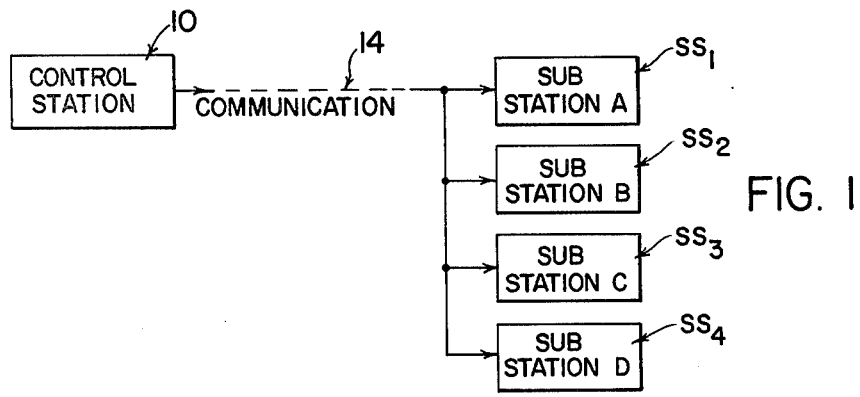
FIG. 1 is a flow chart schematically indicating the general method of utilizing the invention.

As noted above, the present invention originated from a search for a system to control remote components of a system with a binary information signal. FIG. 1 illustrates such a system in flow chart format. The problem is to control the operation of a number of remote components from a central system control station. A system control station indicated generally by reference number 10 is shown in FIG. 1 with a number of system components indicated generally by reference numberals $SS_1$ through $SS_n$ (four shown). The system components $SS_1$ through $SS_n$ are generally remotely located relative to one another and the system control station 10. The system control station 10 and system components $SS_1$ through $SS_n$ are connected by means of a communication system, generally indicated by reference numeral 14. The communication system 14 may be one of any number of systems, such as telephone lines, radio, computers, or other conventional audio grade communication systems.

The present system is useful, as for example, to control a number of electrical power generation sub-stations from a centralized system control station, which are generally remotely located relative to one another. An operator of the control station is responsible for generating and recording or transmitting of the required signals which operate the unmanned power generation sub-stations.

The several remote system components $SS_1$-$SS_n$ are controlled by a series of digital signals. Control of the system components involves turning particular components on and enabling specific functions to be performed at the components. The first step in the control of the components is to generate the series of digital signals. Once the series of digital signals has been generated, transmission of the series of digital signals is effected by conventional audio grade communication equipment. Transmission might include recording the information and subsequently reading the recorded information. Recording media include, for example, magnetic tapes, discs, belts and wires as well as conventional static and dynamic memory means. Transmission of the information is accomplished through the use of audio communication equipment such as radio, television and telephone transmission systems.

Figure 2:
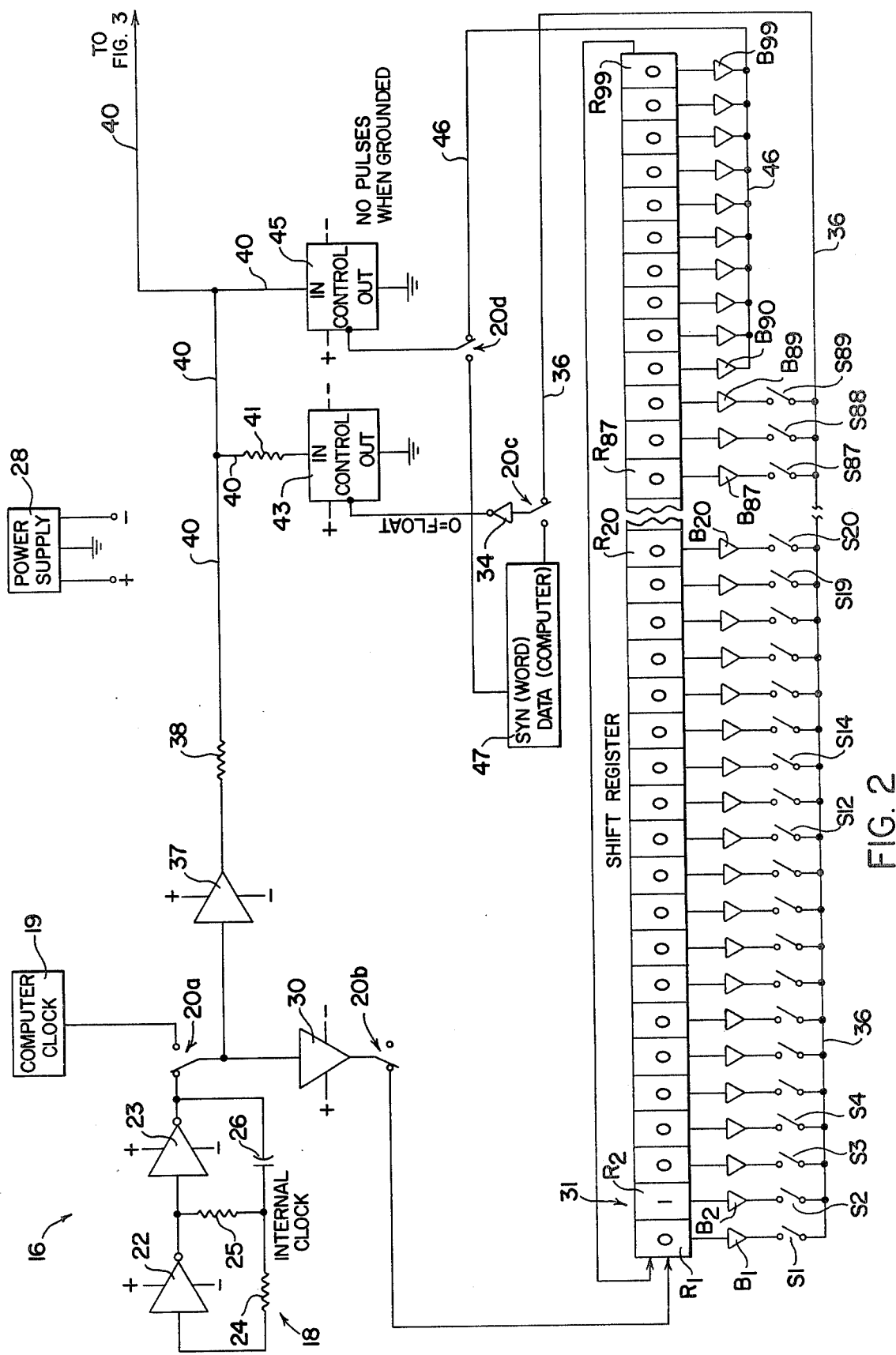
FIG. 2 is an electrical schematic of a transmission portion of the system including clock and data generation.

An electrical schematic of an information generation circuit, indicated generally by reference numeral 16, is illustrated in FIG. 2. The generation circuit 16 includes an internal clock, indicated generally by reference numeral 18, providing the uniform clock pulses required for data transmission and encoding. In the event that the system is being utilized in conjunction with a computer, a computer clock 19 may be substituted for the internal clock 18. A multi-pole switch 20 is utilized for switching between internal control and computer control. One pole of the switch indicated generally be reference numeral 20 is connected in the clock circuit.

The internal clock 18 is provided by a relaxation oscillator constructed of two inverting amplifiers 22 and 23, resistors 24 and 25 and a capacitor 26. The inverting amplifiers 22 and 23 require positive and negative voltage sources. The positive and negative sources are provided by a power supply 28. The sources are preferably identical in value. Both the value and the degree of regulation depend upon the particular type or brand of electronic components used.

It is important to note that while discussions herein may specifically relate to voltages, potentials and voltage levels the system is equally adapted to operation involving current and current levels.

The clock 18 is designed to provide an output which is symmetric with respect to a common or zero potential. The signal appearing at the output of amplifier 23 is a square wave having a 50% duty cycle with a frequency limited only by the communication system chosen. Since the clock signal has no direct current component, distortion is avoided as a result of the audio communications used. The square wave characteristic of the clock signal is filtered automatically as a result of the low pass frequency characteristics of the audio type equipment.

The clock 18 is capable of operating over a wide range of frequencies depending on the values of the resistors 24, 25 and the capacitor 26. An upper limit of the acceptable frequency of the clock is established by the characteristics of the communication system used for transmission. The rate at which data is presented to the communication system is measured in bits per second and determines the clock frequency. Acceptable reliability and performance are obtained at data rates equal to the highest usable frequency of the communication system utilized for transmission. Preferably, a frequency of 3,000 Hz is used.

The clock signal is provided to the input of a buffer 30, which buffer comprises a noninverting amplifier. The buffer 30 is supplied with positive and negative sources from the power supply 28. At the output of the buffer 30 another switch pole 20b functions to disconnect the buffer 30 from the remainder of circuit 16 when a computer is used in conjunction with the system.

When a computer is not being utilized, the switch pole 20b connects the output of buffer 30 to a counter indicated generally by reference numeral 31. The particular type of counter 31 used is not critical. The counter shown in FIG. 2 is a series of shift registers connected as a circulating counter. Ninety-nine registers are shown, $R_1$ through $R_{99}$, connected electrically in a manner resulting in a single binary bit being passed serially from register to register. The number of registers is important only from the point of view of requiring at least as many registers as bits of information desired plus additional bits for controlling a quiet period used for synchronization. The last register $R_{99}$ is connected to the first register $R_1$ such that the single binary "1" is continuously circulated through the counter as long as a clocking pulse is present. The clocking pulse in this situation is the output of buffer 30.

A series of informational pulses are desired for the purpose of identifying which system components are to be actuated and what functions are to be controlled. For each informational pulse or bit desired, a switch S is provided. In FIG. 2, eight-nine bits of information are desired and switches $S_1$ through $S_{89}$ are shown. The switches $S_1$–$S_{89}$ have one terminal connected together at lead 36.

The remaining terminal of each of the switches $S_1$ through $S_{89}$ is individually connected to the output of buffer amplifiers $B_1$ through $B_{89}$. The buffer amplifiers $B_1$–$B_{89}$ are noninverting amplifiers properly connected to the power supply 28. Buffer amplifiers $B_1$–$B_{89}$ are of the type producing an OR logic when two or more of their outputs are connected in parallel. The input of each buffer $B_1$ through $B_{89}$ is electrically connected to the high output of each register $R_1$ through $R_{89}$, respectively. The registers $R_{90}$ through $R_{99}$ which are not connected to the switches have high outputs connected to noninverting buffers $B_{90}$–$B_{99}$. The buffers $B_{90}$–$B_{99}$ have outputs connected in parallel and as a result thereof produce an OR logic.

In the generation circuit 16, only eighty-nine switches are provided for information generation. With the circuit 16 as shown, the ten registers $R_{90}$–$R_{99}$ not equipped with switches, correspond to bits used for synchronization. Any number of switches greater than or less than eighty-nine can be provided. In order to have more than eighty-nine switches, the counter 31 must neccessarily be expanded accordingly. The number of bits used for synchronization is not critical and can be greater than or less than the ten discussed hereinabove.

The clock signal from internal clock 18, or computer clock 19 is simultaneously directed to a buffer 37. As before, the buffer 37 is provided by a noninverting amplifier properly provided with the necessary sources from the power supply 28. The output of the buffer 37 is connected through a resistor 38 to an output indicated by reference numeral 40 of the generation circuit 16.

Also connected to the output 40 of the circuit 16 is a resistor 41 which is in turn connected to the output of a first level adjusting bilateral switch 43. The first bilateral switch 43 may be provided by an electronic logic circuit capable of attaining the desired output from the inputs to be provided. The logic required is obtainable through the use of the bilateral switch. The logic characteristics of the bilateral switch are indicated in Table I.

TABLE I

| CONTROL | IN to OUT Bilateral Impedance |
|---|---|
| 1 | low impedance |
| 0 | high impedance |

The OUT of first switch 43 is permanently connected to ground or zero reference potential. The values of the resistors 38 and 41 are chosen so that if the first switch 43 is in a low impedance state, the signal at the circuit output 40 is diminished to a small precentage of the value of the clock signal. The reduction of the circuit output 40 is caused by the resistor 41 being connected to ground reference through the IN terminal of the first switch 43. When the first switch 43 is in a high impedance state, resistor 41 is effectively disconnected from the the ground potential reference and the output signal 40 is not effected by resistor 41.

The common terminals of switches $S_1$ through $S_{89}$, lead 36, are connected to an inverting amplifier 34. The output of the inverting amplifier 34 is connected to a control terminal of the first bilateral switch 43. The electrical connections result in the first switch 43 being in a high impedance state when a binary "1" is present at lead 36 and in a low impedance state when a binary "0" is present. The digital information desired to be transmitted, up to eighty-nine bits in the case shown herein, is entered by closing the appropriate switches $S_1$–$S_{89}$ when a binary "1" is desired.

When the single "1" bit in the counter 31 is present at a particular register, $R_1$–$R_{99}$, the output of that particular register is equivalent to binary "1". The buffers, $B_1$–$B_{89}$, are noninverting and therefore the output of the particular buffer corresponding to the position of the counter bit "1" is equivalent to binary "1". If the switch, $S_1$ through $S_{89}$, corresponding to the position of the counter bit "1" is closed, a "1" or positive potential is present at the common side of the switch. Since the counter 31 only provides one high output at all ninety-nine registers at any one instant, the remaining switches, regardless of their open or closed status, have no effect on the logic level on lead 36. With no switch $S_1$–$S_{89}$ closed, a negative potential or zero level appears on lead 36 at all times.

With a particular closed switch providing a positive potential, or a binary one, the first bilateral switch 43 is in a high impedance state and thus the output signal 40 is not diminished. For example, if the particular switch corresponding to the position of the binary "1" in counter 31 is open, lead 36 is "low" and the first bilateral switch 43 is in a low impedance state. Likewise, if the particular switch corresponding to the position of the binary "1" in counter 31 is closed, lead 36 is "high" and the first bilateral switch 43 is in a high impedance state.

A second level adjusting bilateral switch 45 has its IN terminal connected to the output 40 of the generation circuit 16. The second bilateral switch 45 operates similarly to the first switch 43 previously described. When the second switch 45 is in a high impedance state the output 40 is not effected. When the second switch 45 is in a low impedance state the output 40 is connected to ground potential and no signal is passed. As before, the OUT terminal of the second switch 45 is permanently connected to ground or zero reference. The control terminal of the second switch 45 is connected to the parallel connected outputs of buffers $B_{90}$ through $B_{99}$. From the time the "1" bit of the counter 31 reaches register $R_{90}$ until the bit leaves register $R_{99}$ the second switch 45 is in a low impedance state and the output 40 of the generation circuit 16 remains at ground or zero potential. Second switch 45 provides a quiet period within the output 40. This quiet period is useful for sychronizing the transmission.

As noted above, the number of switches $S_1$ through $S_{89}$ is totally dependent upon the quantity of information bits desired to be utilized. Likewise, the length of the quiet period is dependent upon the number of registers not utilized for the information signal.

Figure 4A:
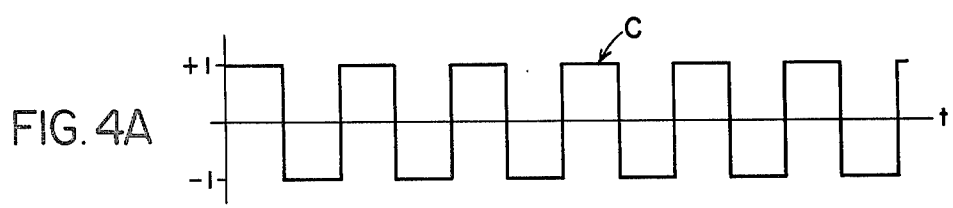
FIG. 4a is a diagram illustrating the clock signal utilized in conversion and transmission of the information.
Figure 4B:
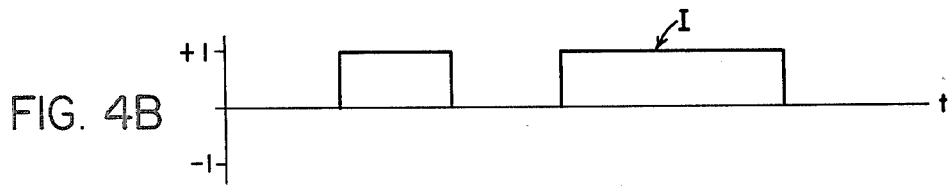
FIG. 4b is a diagram illustrating an example of a digital information signal generated within the communication system.
Figure 4C:
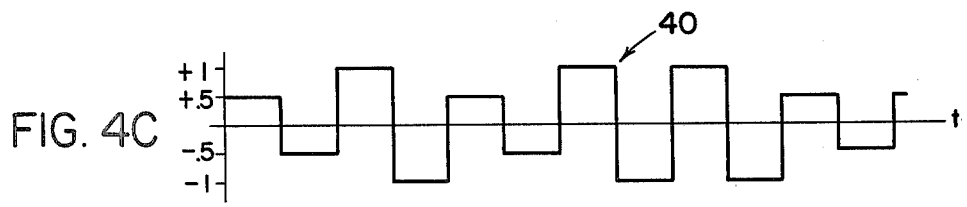
FIG. 4c diagrammatically illustrates an example of an output signal of the transmission portion of the system, which output corresponds to the digital information signal illustrated in FIG. 4b.

The clock signal is a symmetric square wave with no direct current component. The first bilateral switch 43 operates on the clock signal to produce a synchronized amplitude modulated output signal 40. In this manner, the output 40 will always appear identical to the clock signal, as a function of time, except for the period of time referred to as the quiet period. The amplitude of the output signal will have one of three values, i.e. diminished clock, undiminished clock, or no clock, depending upon whether or not an information bit is present at any particular point in time. The important signals present during operation of the circuit 16 are shown in FIG. 4. FIG. 4a indicates the waveform of the clock signal indicated generally by reference numeral C. A value of one is chosen as the amplitude of the clock output. FIG. 4b indicates the waveform characteristic of a particular information signal indicated generally at reference numeral I desired to be transmitted. Pulses with an amplitude of one are utilized to indicate information. The resultant output 40 of the generation circuit 16 corresponding to the input shown in FIG. 4b is indicated in FIG. 4c. The scale of the waveform in FIG. 4c corresponds to resistors 38 and 41 disipating half of the total clock signal amplitude.

In the event that a computer is desired to be interfaced with the generation circuit 16, the counter 31 is eliminated by repositioning switch poles 20c and 20d to allow connection to the computer and substitution of a computer data stream 47.

The block diagram of FIG. 5 illustrates, more generally, the intention of the generation circuit 16. The oscillator 18, operating as noted hereinabove, is electrically connected to the counter 31. The counter 31, which may be arranged to be non-recirculating, has its individual outputs electrically connected to a switching array 42. The switching array 42 provides an individual switch for each information bit desired to be converted. The lead 36 electrically connects the switching array 42 to a switch means 44. The switch means 44 is also electrically connected to the oscillator 18 by lead 48.

The operation of the generation circuit 16 shown in FIG. 5 is similar to that of the circuit shown in FIG. 2. The information desired to be converted is presented to the circuit 16 by appropriate selective positioning of the switching array 42. The oscillator 18 operates the counter which in turn converts the information presented to the switching array 42 into serial information signals on lead 36. The switch means 44 combines the oscillator signal on lead 48 and the serial information signals on lead 36.

The output of the switch means 44 appears similar to the oscillator signal with the exception that the amplitude depends on whether an information bit is present or not. Assuming that the oscillator signal is depicted in FIG. 4a and the information, lead 36, is depicted in FIG. 4b, the output 40 would be as depicted in FIG. 4c.

The output 40 of the generation circuit 16 is the signal to be recorded or transmitted by the communication system 14 in FIG. 1. This signal 40 may be directly recorded for use at a subsequent time, or presented to the communication system 14 for transmission. The receiving circuit, indicated generally by reference numeral 49, is shown in electrical schematic form in FIG. 3. The output from the generation circuit 16 enters the receiving circuit 49 at the left of the figure.

A level detector 50 which may be any of a number of well known circuits such as a Schmitt trigger operates on the output signal 40. The function of the level detector 50 is to output a binary "0" when only the clock pulse is present and a binary "1" when an information bit is present.

The output signal 40 is simultaneously received by the level detector 50 and a timing circuit 51. The function of the timing circuit 51 is to determine when the quiet period, referred to above, occurs. The output, lead 52, of the timing circuit 51 is used to reset a counter, indicated generally by reference numeral 53. The counter 53 comprises eighty-nine registers $RR_1$ through $RR_{89}$. These registers are connected so that a single binary "1" bit passes serially therethrough without being recirculated.

When the timing circuit 51 detects the quiet period which corresponds with the "1" bit being present in register $RR_{80}$, the counter 53 is reset by the corresponding signal on lead 52. The registers $RR_1$ through $RR_{89}$ are in direct correlation with the registers $R_1$ through $R_{89}$ of counter 31 (FIG. 2).

Each of the registers $RR_1$ through $RR_{89}$ has the high output electrically connected to the clock input of one of eighty-nine D type flip-flops, $FF_1$ through $FF_{89}$. The eighty-nine flip-flops $FF_1$–$FF_{89}$, correspond to the eighty-nine information bits, represented by switches $S_1$–$S_{89}$, referred to in FIG. 2. The D (data) terminal of the flip-flops $FF_1$–$FF_{89}$ are connected in common at lead 57 to the level detector 50. Thus, the inputs of the flip-flops are "high", that is binary "1", whenever a digital information bit is detected. As is the case for most D type flip-flops, the data must preceed the clock pulse for proper operation to occur. If the D input is "high" when the clock pulse arrives at any particular flip-flop, $FF_1$ through $FF_{89}$, the output of the flip-flop is "high". If the D input is not "high" when the clock pulse arrives, the output of the flip-flop is "low", that is binary "0".

The counter 53 and detector 50 are precisely sychronized as a result of the output signal 40 being presented to both the counter and level detector simultaneously. Consequently, when the clocking cycle is complete, the flip-flops $FF_1$–$FF_{89}$ contain the precise information desired, in proper serial order, as originally encoded and transmitted at the respective outputs (Q).

By utilizing the outputs of flip-flops, $FF_1$ through $FF_{89}$, directly in this case, eighty-nine system components may be turned on or off. If the outputs of flip-flops $FF_1$–$FF_{89}$ are combined, considerably more system components are capable of being controlled. Other operational functions of the system components $SS_1$–$SS_n$ may also be controlled at the central system control station 10 through the combined outputs of flip-flops $FF_1$–$FF_{89}$.

The outputs of the flip-flops $FF_1$–$FF_{89}$ are combined through the use of gates $G_1$ through $G_n$, only five of which are indicated in FIG. 3. The gates shown are AND gates, the logic characteristics of which are indicated in Table II.

TABLE II

| IN₁ | IN₂ | IN₃ | OUT |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 1 |

Irrespective of the number of inputs to any particular one of gates $G_1G_n$, the output of any gate will only by "high" when all inputs to that gate are "high". The outputs of the gates $G_1$ through $G_n$ are directed to the corresponding system components $SS_1$ through $SS_n$ (five shown). Operation of any particular system component is commenced when a "high" signal is received from the corresponding gate $G_1$ through $G_n$. As will be evident now, the system of the present invention is useful to control a number of remotely located system components through operations conducted at a central system control station.

A computer may be utilized in conjunction with the receiving circuit 49 by repositioning the switch 20 and thus, switch poles 20e and 20f. The switch poles 20e and 20f eliminate the counter 53 from the circuit 49 and replace this portion with a computer signal means 60.

What is claimed is:

1. A data conversion method comprising the steps of generating a repetitive clock signal having first and second phases of a predetermined amplitude, representing a series of binary digits through actuation of a series of switching means each having a first condition corresponding to one binary situation and a second condition corresponding to the other binary situation, inputting said clock signal to a counting means to produce a plurality of timing signals, and inputting said plurality of timing signals to said series of switching means to produce a data signal, generating an output signal by combining said clock signal and said data signal, and transmitting said output signal through use of a communication means.

2. The method according to claim 1 wherein transmitting said output signal includes recording said output signal.

3. The method according to claim 1 wherein inputting said plurality of timing signals to said series of switching means includes individually inputting each of said plurality of timing signals to an input of each of said series of switching means, connecting an output of each of said series of switching means to a common output whereby said data signal is produced at said common output.

4. The method according to claim 3 wherein generating said output signal includes limiting said data signal through use of a bilateral switch means to produce a limited output with said clock signal.

5. The method according to claim 3 further including receiving said output signal after transmission, combining said output signal with a second plurality of outputs of a second counting means, detecting relative amplitudes of the second plurality of outputs of said second counting means with level detector means, and combining said second plurality of outputs of said second counting means with an output of said level detector means through a third plurality of gating means.

6. The method according to claim 5 wherein detecting relative amplitudes of said second plurality of outputs of said second counting means includes equating a first amplitude level of said output signals with one binary situation and equating a second amplitude level of said output signals with the other binary situation.

7. A data conversion system comprising: clock means for generating a repetitive bipolar square wave clock signal; first counter means for generating a repetitive first plurality of outputs in response to said clock signal; a series of manually selectable switch means for indicating one of a first and a second binary situation; said series of switch means connected in electrical parallel with said first counter means, said first plurality of outputs of said first counter means generating a second plurality of outputs of said series of switch means, modulation means for generating an output signal, said modulation means combining said second plurality of outputs of said series of switch means and said clock signal, and communication means for preserving said output signal.

8. The data conversion system according to claim 7 wherein said first situation indicated by said series of switch means corresponds to the presence of a binary information bit and said second binary situation indicated by said series of switch means corresponds to the absence of the binary information bit.

9. The data conversion system according to claim 8 wherein said modulation means includes detector means for sensing the relative amplitude of said output signal, and limiting means for altering the magnitude of said clock signal whenever said detector means senses said second binary situation.

10. A data conversion system comprising a generation portion, a communication portion, and a receiving portion,
said generation portion including clock means for generating a repetitive clock signal having first and second phases of a predetermined amplitude, first counter means for generating a first plurality of outputs in response to said clock signal, a series of switching means for indicating a series of binary digits having a first condition corresponding to one binary situation and a second condition corresponding to the other binary situation, said series of switch means combining said first plurality of outputs of said first counter means to provide a switch output, modulation means for combining said switch output and said clock signal to provide an output signal;
said communication portion preserving the output signal for said receiving portion; and,
said receiving portion including second counter means for producing a second plurality of outputs, detector means for detecting one of said first and second binary situations in said output signal, a third plurality of gate means for combining the second plurality of outputs from said second counter means and an output of said detector means, said third plurality of gate means providing an output representing binary digits each having a first condition corresponding to one binary situation and a second condition corresponding to the other binary situation.

11. The data conversion system according to claim 10 wherein said detector means includes threshold level means for indicating at least one relative amplitude of said output signal wherein said relative level corresponds to one of said first and second binary situations.

* * * * *